July 5, 1966 W. L. SCHULTZ ETAL 3,259,168
HYDRAULICALLY CONTROLLED TIRE CHANGING MACHINE
Filed Oct. 24, 1961 5 Sheets-Sheet 5
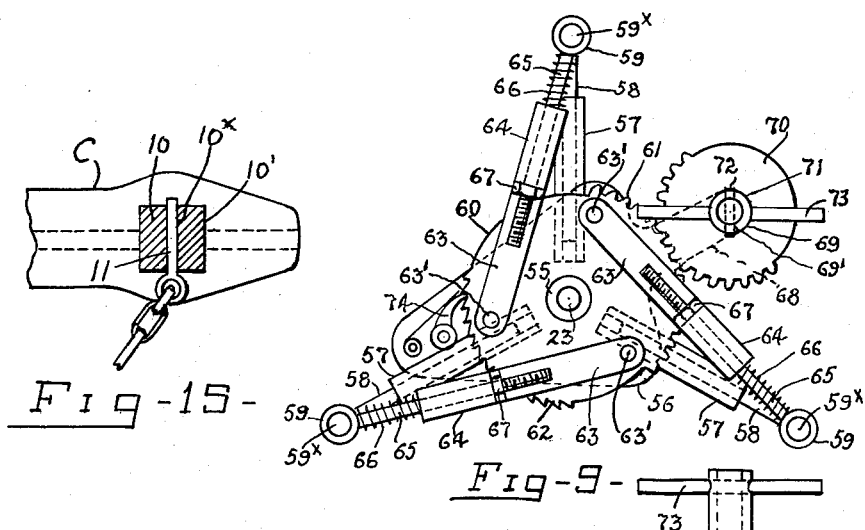
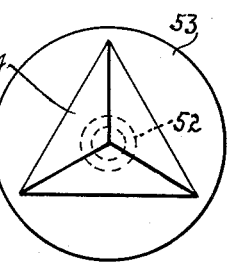
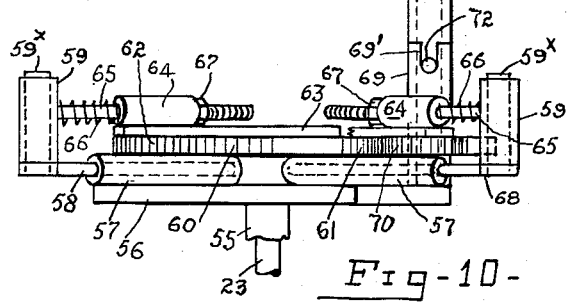
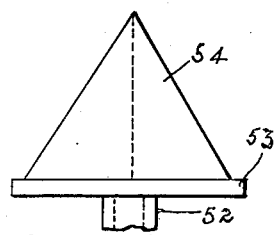
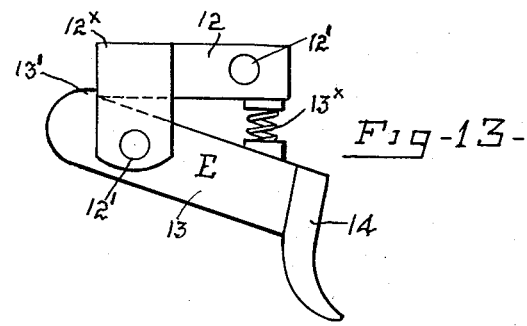
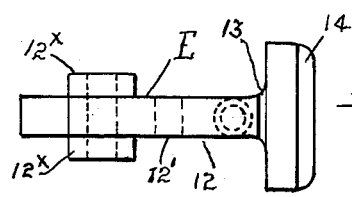
Inventors
W. L. Schultz
M. J. Schultz
By G. S. Roxburgh
Their Atty

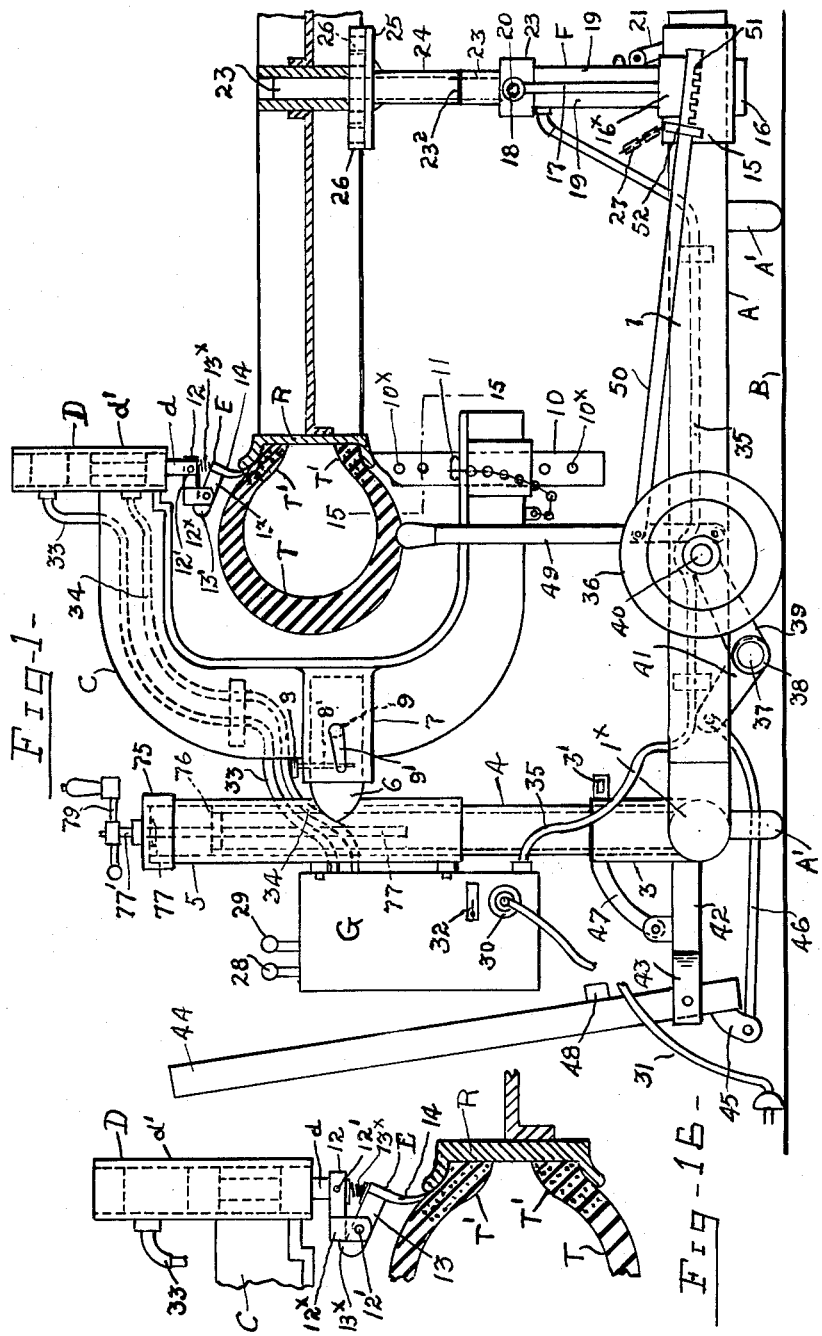

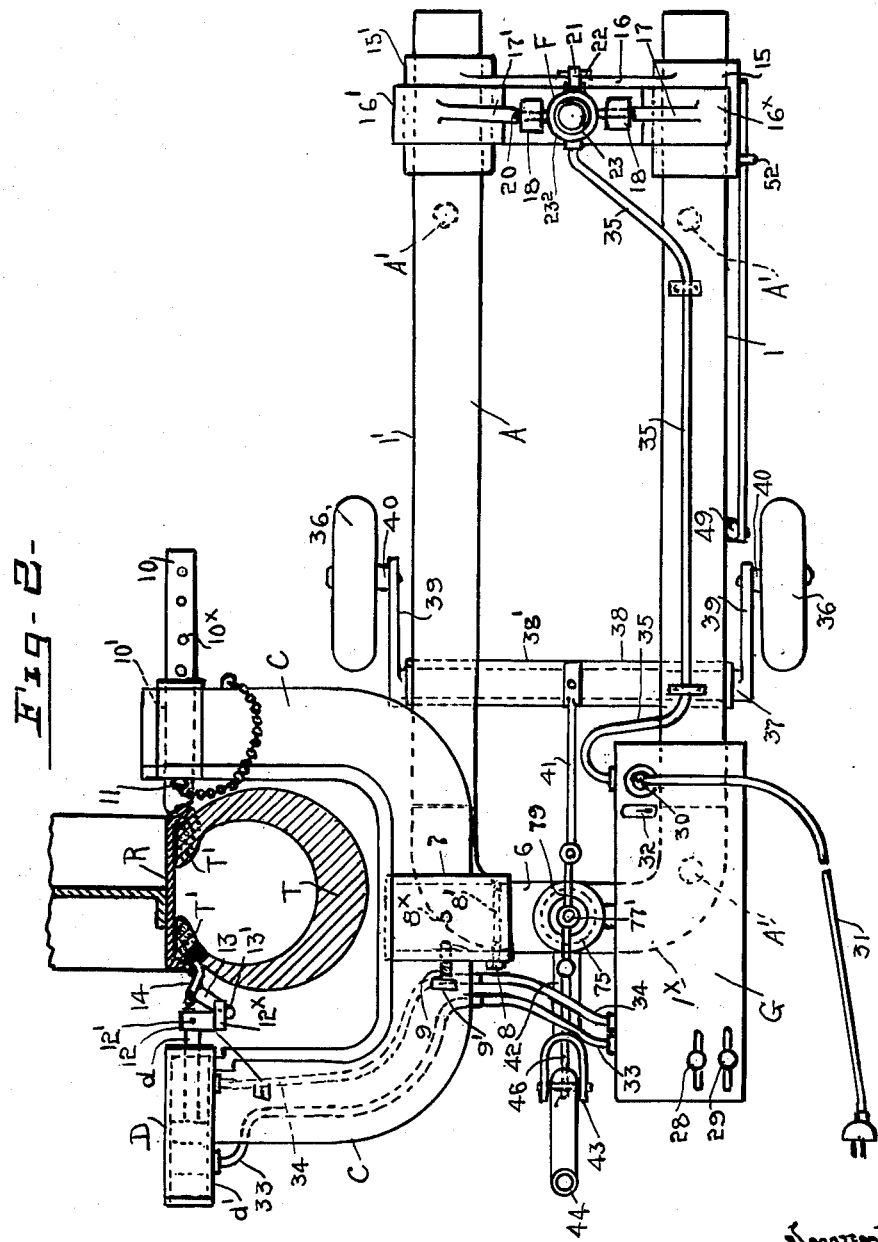

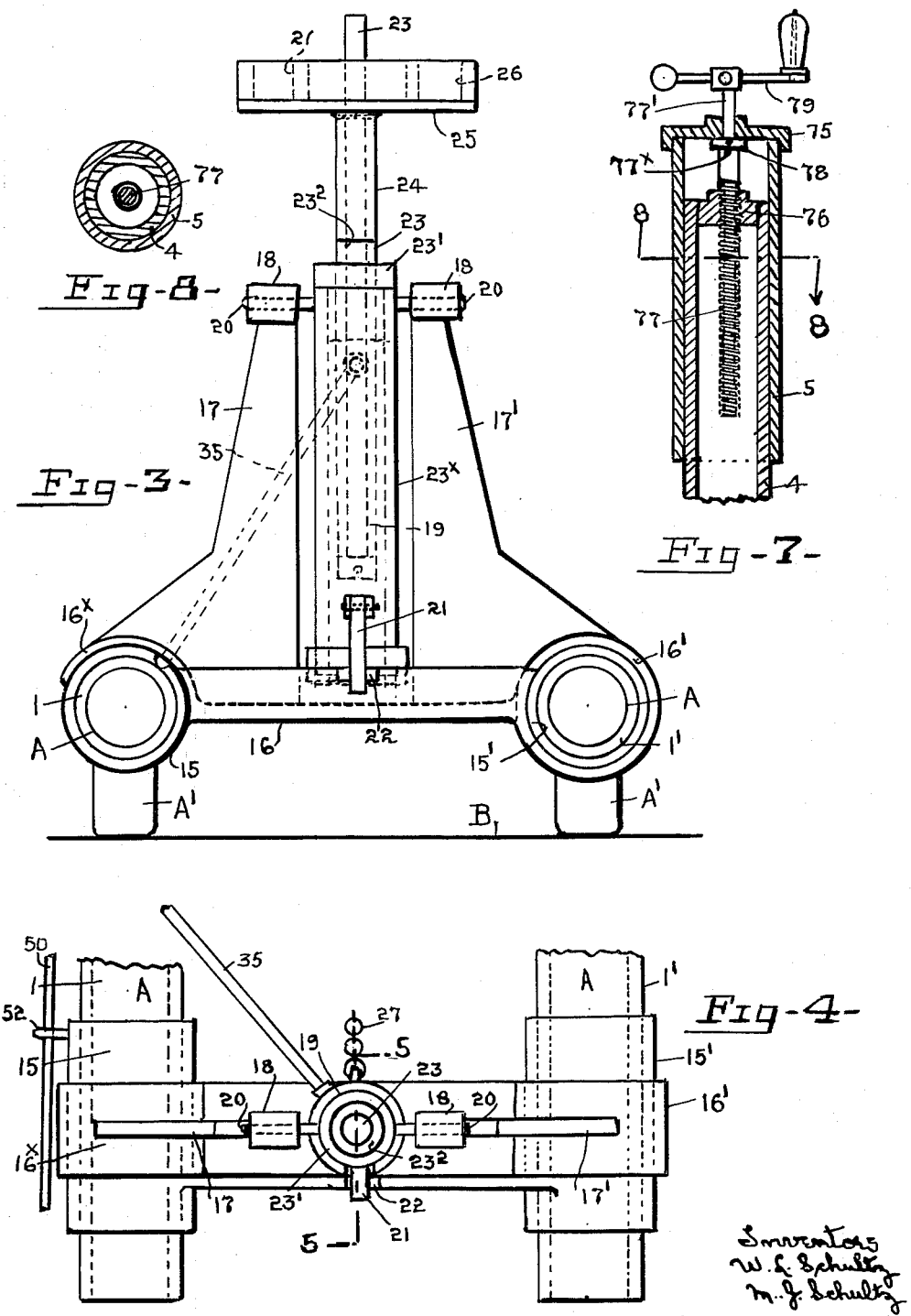

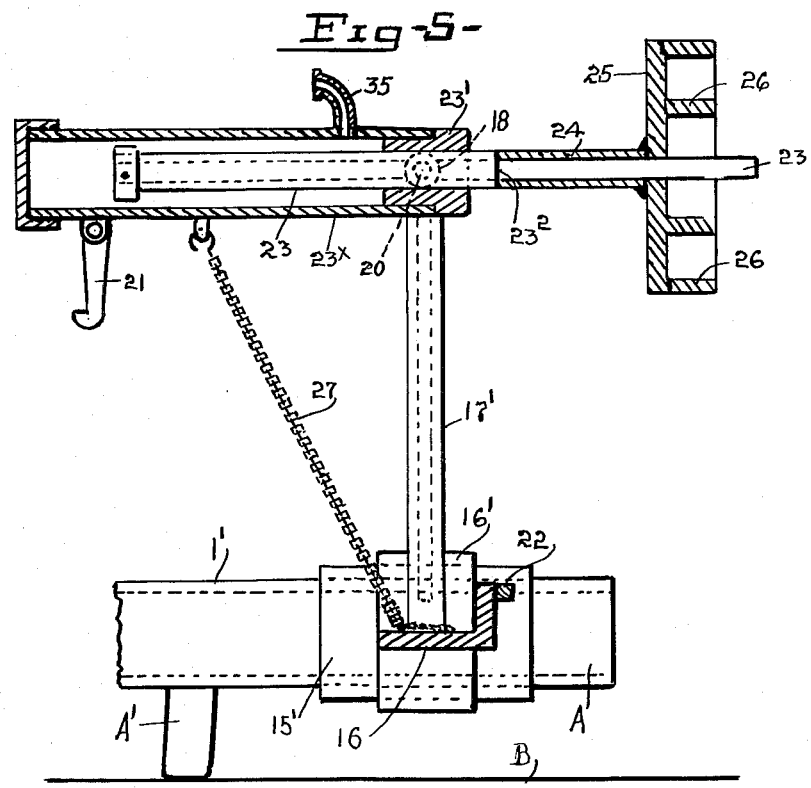
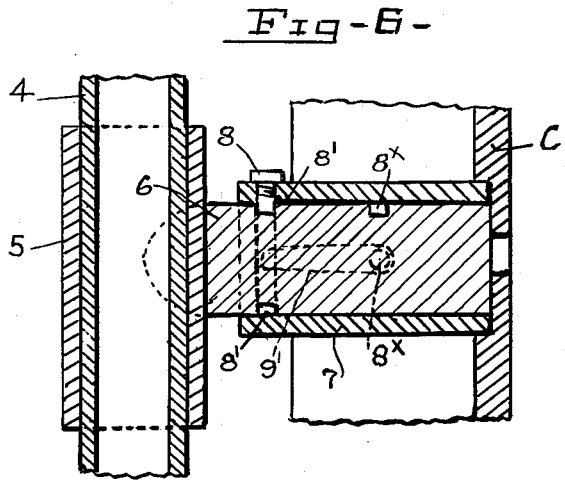

United States Patent Office 3,259,168
Patented July 5, 1966

3,259,168
HYDRAULICALLY CONTROLLED TIRE CHANGING MACHINE
William L. Schultz and Matthew J. Schultz, both of Red Lake Falls, Minn.
Filed Oct. 24, 1961, Ser. No. 147,373
4 Claims. (Cl. 157—1.26)

The invention relates to improvements in hydraulically controlled tire changing machines and a primary object is to provide a machine by the use of which tires can be easily and quickly removed from their rims and with a minimum of labour and irrespective of the prevailing sizes of tires and rims and whether the rims are hub or hubless, the actual work of releasing the tire from the rim being accomplished under hydraulic pressure and without damage to rim or tire.

A further object is to provide a machine with a normally upstanding clamping member which can be adjusted towards or away from its supporting base frame and releasably locked in adjusted position and which is provided also with a hydraulically actuated ram and associated tool for engagement between a tire bead and its retaining flange and with an adjustable shank to support the flange of the rim remote from the tool.

A further object is to so design the tool that in entering and operating between the flange and bead and under hydraulic pressure to separate them, it will also move in across the rim to clear the bead from the rim.

A further object is to mount the clamping member so that becoming unlocked it can be turned to a horizontal position and swung to the side of the frame and releasably locked there for tire changing purposes, and such without interfering with the adjustment of the clamping member in either position.

A further object is to provide a second, normally upstanding ram in advance of the clamping member and adjustable towards and away from it and equipped with means for supporting and centering a hub or hubless rim in horizontal position and wherein the activation of the ram will raise or lower the ram supported rim for subsequent positioning in relation to the tool and shank of the clamping member for tire removal purposes.

A further object is to mount the forward, second ram, so that it can be swung forwardly from a releasable locked position to a position to permit a rim with inflated tire to be mounted thereon and become centered and swung back with the ram to take a horizontal position, such arrangement avoiding having to bodily and manually lift the rim and tire to get it in horizontal position on the ram for subsequent tire changing operations.

A further object is to provide carriage wheels which can be lowered to raise the machine frame from the ground or floor and releasably locked in such position and also to provide the machine, rearwardly, with suitable means for steering it from place to place.

A further object is to provide the machine with a casing to house and mount the well known mechanisms and parts for selectively and hydraulically actuating the rams as and when required by the attendant and assuming that provision is made for connecting up with a source of electric current supply controlled by a switch.

A further object is to supply the machine with various demountable and replaceable rim supporting and centering means to be used in conjunction with the forward ram and to accommodate various diameter, rim hubs or to grip and support hubless rims.

With the above more important and other minor objects in view and which will become more apparent as the description proceeds, the invention consists essentially in the arrangements and construction of parts shortly described, reference being had to the accompanynig drawings in which:

FIG. 1 is a side view of the machine with the clamping member shown in a central and vertical position on its supporting base frame and with a portion of a wheel rim and deflated tire mounted on the machine for tire changing purposes.

FIG. 2 is a plan view of the machine with the clamping member swung to one side of the machine frame and in a horizontal position and showing also a portion of an upstanding wheel rim and tire in position to have the deflated tire removed from its rim.

FIG. 3 is an enlarged view of the front end of the machine and showing the forward ram in its vertical position.

FIG. 4 is a plan view of the parts as they appear in FIG. 3 but with the rim supporting device shown in FIG. 3 removed.

FIG. 5 is a vertical sectional view taken at 5—5 in FIG. 4 and showing the pivoted, front ram swung forwardly and downwardly and appearing part in side elevation and part in vertical, central, longitudinal section.

FIG. 6 is an enlarged detailed sectional view centrally through the post and showing the sleeve and the stub axle associated therewith together with a portion of the clamping member.

FIG. 7 is an enlarged vertical sectional view centrally the upper part of the post and associated sleeve and showing the means for adjusting the sleeve along the post.

FIG. 8 is a horizontal sectional view at 8—8, FIG. 7.

FIG. 9 is a plan view of a device provided for rotatably supporting a hubless rim on the upper end of the forward ram and for clamping the rim firmly in horizontal position.

FIG. 10 is a side view of the parts appearing in FIG. 9.

FIGS. 11 and 12 are plan and side views of an alternative centering support for a wheel rim having a hub and utilized in association with the forward ram.

FIG. 13 is an enlarged detailed side view of the tool utilized to spread the bead of a tire away from its normally retaining flange, and also from the rim.

FIG. 14 is a plan veiw of the tool appearing in FIG. 13.

FIG. 15 is an enlarged, detailed, horizontal sectional view taken at 15—15 in FIG. 1 and looking downwardly.

FIG. 16 is an enlarged, detailed side view of the ram carried by the upper arm of the clamping member and showing the tool carried thereby about to become entered between the rim flange and the tire bead, the latter parts appearing in vertical section.

In the drawings like characters of reference indicate corresponding parts in the several figures.

The main or base frame A is horizontally disposed and is supported from the floor or ground B by similar legs A'. Actually the frame is formed from stout spaced and parallel tubes 1 and 1' of predetermined length and welded firmly together by cross tube 1$^x$. An upstanding, split socket 3 is securely welded centrally to the cross tube and demountably receives the lower end of an upstanding post 4 which is tubular and the split socket is supplied with a cross bolt 3' to firmly anchor the post within the socket. The post slidably and rotatably receives a vertical sleeve 5 having horizontally disposed short stub shaft 6 securely welded thereto and such shaft rotatably enters a tubular bearing 7 which is integrally and centrally cast with a two armed clamping member C. Suitable means is provided to prevent the escape ot the bearing 7 from the free end of the stub shaft such as a screw 8 threaded through the bearing and entering a channel 8' circumscribing the stub shaft. Suitable means is also supplied for locking the clamping member C in the vertical position as appearing in FIG. 1 or in the horizontal position as shown in FIG. 2, at the side of the frame. Such is shown as a screw 9 threaded through the bearing 7 and provided with a handle 9' for turning purposes, whereby the screw 9 can be caused to enter similar holes 8ˣ provided in the stub shaft. Means, later described, is provided for shifting the sleeve 5 on the post 4 in order to vary its position along the post and without interfering with its rotation around the sleeve.

The two armed clamping member has its upper arm provided at its free end with a hydraulic ram D and the forward end of the lower arm supplied with a square hole 10' which receives slidably a tire rim engaging shank 10 supplied with spaced adjusting holes 10ˣ and an anchoring, adjusting pin 11. The rod $d$ of the ram is rotatable in its cylinder $d'$ and has its downwardly projected end supplied with a specially designed tool E for separating the bead of a tire from its retaining flange. The tool comprises a bar 12 pivoted at 12' to the protruding end of the rod $d$ and similar side lugs 12ˣ are welded to and extend downwardly from the sides of the bar as shown most clearly in FIGS. 13 and 14 of the drawings. The lower ends of the lugs pivotally support a short lever 13 the free end of which has a turned and tapered jaw 14 welded permanently thereto and extending laterally from the sides of the lever. A catch 13' is supplied at the pivoted end of the lever and a coiled spring at the other end, indicated at 13ˣ, and such prevent the lever from dropping down yet permit it a limited freedom of movement.

When the clamping member C is in its vertical position as appearing in FIG. 1 it is most desirable that the wheel rim centering and supporting member indicated generally at F in FIGS. 1 and 2 and including a hydraulically actuated ram, be adjustable toward and away from the clamping member C and also adjustable in height and the parts constituting such part of the machine are now described in detail.

The forward ends of the tubes 1 and 1' have similar sleeves 15 and 15' slidable thereon and a cross bar 16 of angle iron cross section connects the sleeves and which bar has one end terminating in a ring or eye 16' receiving the sleeve 15' and the other end provided with a saddle 16ˣ riding the sleeve 15. This allows the bar 16 to be swung upwardly to the side and with everything it supports. The cross bar is supplied with similar, upstanding, spaced and suitably reinforced legs 17 and 17' the upper ends of which terminates in similar, transversely aligned bearings 18 to pivotally support a suspended ram 19 between the legs, there being similar pivot spindles 20 welded to the sides of the ram and entering the bearings 18. In its suspended, upstanding position the lower end of the ram 19 engages the upstanding flange of the cross bar 16 and it can be locked in such position by a hooked latch 21 pivotally attached to the lower end of the ram and engageable with a centrally and forwardly extending catch 22 welded to the cross bar.

The rod 23 of the ram 19 can be supplied with various kinds of wheel rim supporting and centering devices depending on whether the rims have variable diameter central hubs or are hubless. For rims that have hubs of greater internal diameter than the average automobile wheel, the support end centering device can be in the form of a tubular shank 24 resting on the shoulder 23² provided by reducing the upper end of the rod in diameter, to project beyond the shoulder and it being observed the shoulder is always above the closure cap 23' of the ram, and by providing the upper end of the shank 24 with a fixed, circular, horizontal plate 25 having a number of spaced, upstanding and concentric rings 26 secured permanently thereto. If the hub is of relatively small internal diameter, the reduced end of the rod 23 will center it and the shoulder 23² will support it. The larger diameter hubs can be centered by rings of the plate 25 and also supported by the shoulder 23².

In order to avoid having to manually and bodily lift a wheel with deflated tire thereon, the ram has been pivotally suspended as hereinbefore described and the arrangement is such that after having been unlocked, the ram can be swung forwardly and downwardly to bring it into alignment with the hub of a wheel which has been raised to a canted position on the floor or ground. It is an easy matter then to hydraulically extend the reduced end of the rod 23 into the hub and then return the ram 19 to its upstanding position and re-lock it there with the rim centered and held in horizontal position. In any down turned position of the ram it can be held supported by a length of chain or the like 27 supplied.

The sleeve 5 has a casing G secured to it at the side remote from the clamping member C and which moves with the clamping member. This casing contains all the well known equipment necessary to utilize oil under pressure to operate both rams and with the applying and releasing of oil pressure under the control of control levers 28 and 29 operable at the top of the casing, one for each ram. A female plug 30 is also supplied on the casing and is electrically connected to an electric motor within the casing and which is part of its internal, well known equipment and a feed line 31 leads from the plug to a source of electric current supply. A suitable switch is supplied on the casing, the switch 32 being utilized to start or stop the motor. The motor is supplied to pump oil under pressure to operate both rams.

The ram D operates under oil pressure in two directions and is connected by suitable hose 33 and 34 to the casing and which have flexible and non-flexible parts to accommodate movements of the casing G with those of the clamping member C. The ram 19 responds to oil pressure in one direction, returning under gravitational force and it is also connected by suitable hose 35 to the casing.

It is desirable to have the base or main frame A mounted so that it can be raised clear of the ground or floor and to such end it is provided centrally with similar carriage wheels 36 which when in down position and locked, make it very easy to wheel the machine from place to place. The structure provided for such purpose comprises the following. A cross shaft 37 centrally underlies the frame and is rotatably received within similar tubular bearings 38 and 38' welded to the under sides of the tubes 1 and 1' and the extended ends of the shaft 37 are fitted with similar forwardly extending cranks 39 provided with outstanding spindles 40 on which the carriage wheels 36 are rotatably mounted. A central lever 41 is secured to the shaft 37. The frame A is provided rearwardly and centrally with a rearwardly extending stout bar 42 which terminates in a fork 43 and the fork receives pivotally the lower end of a normally upstanding, elongated, tubular handle 44, the extended lower end of which is supplied with a curved crank 45 to which is pivotally attached a shifting rod 46, the front end of which is pivotally secured to the lever 41. This arrangement permits an attendant to raise or lower the wheels 36 as desired and any suitable means can be used to lock them in their lowered positions. Such as herein shown as a latch 47 pivotally secured to the bar 42 and adapted when thrown back to become engaged with the underside of a catch 48 welded to the handle 44 when the handle is in its down position. The handle is locked in its down position so that it can be easily grasped by an attendant to permit him, conveniently, to steer the machine from place to place or back it up as required.

It has hereinbefore been stated that the sleeves 15 and 15' are movable towards and away from the clamping member C. To this end, an upstanding hand lever 49 is pivoted to the base frame A and has a forwardly going shifting bar 50 pivotally secured thereto, the forward end of which is toothed on its underside, as indicated at 51, to be brought into engagement with a receiving eye 52 secured to the adjacent sleeve 15. The bar 50 can be obviously cleared from the eye when it is desired to swing the bar 16 laterally.

It is well known that wheel rims vary in diameter, some having hubs and others being hubless, and such variations are accommodated by our machine in the operation of changing a deflated tire T from its rim R. In order to do this the following explanation is given. The smaller rims and tires, such as presently used on automobiles and light trucks, vary somewhat in rim diameter, and in some cases have hubs or are hubless. If the hub of a wheel fits the protruding end of the rod 23 of the rim 19 it becomes centered by the reduced end of the rod and supported by the shoulder 23². However to accommodate the various, larger diameter hubs, a centering and supporting device such as that already described and appearing best in FIGS. 3 and 5, is used. Such centering and supporting device could be modified, in structure, to serve its purpose and a modified structure is shown in FIGS. 11 and 12 and presents a hollow shank 52 supporting a circular plate 53 mounting a pyramid 54.

In cases where the wheel rim is hubless, a different type of centering and supporting device for the rim is supplied, and such is of the expandable type to firmly grip the inner face of the rim. Such a device is shown in detail in FIGS. 9 and 10 of the drawings and is now described. It provides a central sleeve 55 to receive the end 23 of the rod of the rim 19 and the sleeve has an angular plate 56 secured thereto to rotate therewith. A plurality of similar tubes 57 are welded securely to the upper face of the plate and radiate outwardly from the sleeve 55 and are placed 120 degrees apart. Each tube slidably receives a rod 58 the outer end of which is provided with an upstanding spindle 59ˣ on which a roller-like rim gripping, sleeve 59 is rotatably mounted. On the sleeve 55 and above the tubes 57 is a gear wheel 60 which presents a series of gear teeth 61 and a series of ratchet teeth 62. Similar sway bars 63 are pivoted at 63' to the upper face of the gear wheel and each is provided with a guideway 64 to slidably guide a rod 65, the outer end of which is securely welded to one of the sleeves 59. A tension spring 66 is applied on each rod between guideway 64 and adjacent sleeve 59 and the inner end of each rod is threaded to receive a spring adjusting nut 67. An outstanding shank 68 is fixedly secured to the plate 56 and rotatably supports an upstanding sleeve 69 to which a toothed pinion is secured to mesh with the gear teeth 61 and the said sleeve is supplied with diametrically opposing slots 69' at its upper end. A removable winding stem 71 is fitted with a cross pin 72 to enter the slots for pinion turning purposes and the stem is supplied with hand grips 73 at its upper end. There is also a spring pressed pawl 74 supplied to engage the ratchet teeth 62, the pawl being pivotally supported from the plate 56. The whole device, as just described, is so arranged that as the pinion is rotated in one direction it rotates the gear in a clock-wise direction and the pivoted sway bars 63 effect the out pushing of the rim gripping sleeves 59. Obviously the pawl will prevent back turning of the gear when the sleeves 59 have very tightly gripped the rim R of a hubless wheel. Any other device which would serve the same purpose could be substituted for that just described.

When using the machine with the clamping member in central, vertical position as shown in FIG. 1, the wheel rim is centered and supported in a horizontal position at the projecting upper end of the rim 19, having previously picked up the rim with deflated tire in the manner hereinbefore disclosed. One then causes the rim 19 to rise to a height so that the rim and tire can be passed between the arms of the clamping member by manipulating the lever 49, and appear in a more or less central position between the arms. One then can raise or lower the sleeve 5, as required, by using a hand actuated arrangement now described. The upper end of the sleeve 59 extends beyond the post and is closed by a cap 75 (see FIG. 7) and the underlying end of the post is closed by a plug 76. The plug is screw threaded to receive an elongated screw 77 which has its upper end 77' reduced in diameter to provide a shoulder 77ˣ and such shoulder supports the flat lying ring 78 which engages the underside of the cap 75, it being understood that the reduced end of the screw passes rotatably through the cap and is supplied with a hand actuated crank 79. The above arrangement in no way interferes with the adjustment of the clamping member on the post when the clamping member is swung to a horizontal position at the side of the machine and as appearing in FIG. 2.

Following the aforesaid adjustments, to bring the rim into a position to have its tire removed, the shank 10 is adjusted to effectively support the underlying flange of the rim and then the tool E is brought under hydraulic pressure to take its place with the lower tip of the jaw entered between the upper rim flange and adjoining tire bead T' and in this it is to be remembered that the tool as a whole can be rotated to smoothly fit in its initial position between flange and bead. Subsequently, the ram is again actuated to descend slowly and as it descends the jaw clears a portion of the bead away from the flange and having descended to contact with the then upper part of the rim it travels inwardly across the rim to clear the upper bead from the rim. Subsequently the tool is hydraulically withdrawn and the wheel rim is rotated a fraction of a turn and then the tool is actuated to pass again between rim flange and bead as before. Such operations are continued until the bead has been completely cleared from both flange and rim. If it be found necessary, the rim with tire can be turned upside down and similar operations carried on in regard to the other flange and bead.

While we have described the various timings of the movements of the rim in a certain order to bring it to the position shown in FIG. 1 to have work done on it by the jaw, it will be readily appreciated that the timing of the various movements could be varied, as the essential feature is the final proper placement of the jaw in respect to the bead and flange at the start of tire changing operations.

The feature of having the clamping member C so that it can be brought to a horizontal position at the side of the frame, is quite important, as it permits the prevailing large diameter rims and tires to have their tires removed from the rims with a minimum of labour and very effectively and without damage. With the clamping member set and locked in the horizontal position shown in FIG. 2, an upstanding large wheel can be entered between the arms of the clamping member C by rolling the wheel towards the machine and with the main frame resting on the floor. Prior to this, the clamping member will have been lowered towards the floor so that the upgoing portion of the deflated tire will not strike the clamping member at the junction of the arms. By proper placement of the upstanding wheel, the rim can be brought into proper positioning for effective tire changing by the tool E and shank 10 and in the manner already explained. The ram 19 is not in use during this performance.

There is a further important value in the horizontal, side positioning of the clamping member C. Often times cars, trucks, tractors and so forth having a deflated tire are parked, inside or outside, in close proximity to an obstruction which it is not convenient or desirable to move, and such obstruction could be a wall. If the deflated tire is to be removed be in close proximity to the obstruction, then the machine will be required to be maneuvered to permit the horizontally disposed clamping member to be passed underneath the chassis of the vehicle and brought to a position to permit the tire changing operation to be carried out by the tool E. During this operation the cross bar 16 has been swung to the side, out of the road, and that leaves a clear open space between the forward ends of the tubes 1 and 1' for the machine to be advanced towards the wheel for proper positioning in relation to the tool E. The wheel, of course, will have been previously jacked up to permit the wheel to be rotated as the work of changing the tire proceeds.

We claim:
1. A tire changing machine, in combination, a rigid base frame, an upstanding post fixedly anchored to the frame, a vertically disposed sleeve endwise slidable and rotatable on the post, a horizontally disposed stub shaft fixedly secured to and turnable laterally with the sleeve, a tubular bearing rotatable on the stub shaft and provided with means to prevent escapement of the bearing from the stub shaft, a spread, two armed clamping member fixedly and centrally secured to the bearing to rotate therewith, means for locking the bearing against rotation in either an upstanding, vertical position of the clamping member or a turned horizontal position thereof, means for shifting the sleeve endwise on the post and retaining it in any shifted position and fluid pressure applying means supported by the opposing ends of the clamping member to engage with and release a tire from the retaining flanges of a wheel entered between said arms.

2. The device as claimed in claim 1 together with a normally upstanding wheel rim supporting and centering device mounted on the forward end of the frame, said latter device being provided with means to adjust it on the frame towards or away from the clamping member and with means to permit it to be swung laterally over and down towards the frame, as and when desired.

3. The device as claimed in claim 1 together with a normally upstanding wheel rim supporting and centering device mounted on the frame in advance of the clamping member, said wheel rim and centering device being associated with means to adjust it towards or away from the clamping member and with means to permit it to be swung laterally over and down towards the frame, as and when desired, and also with means to allow it to swing forwardly and downwardly and subsequently locked in upstanding position.

4. The device as claimed in claim 1 together with a normally upstanding device supported by the frame in advance of the clamping member and provided at its upper end with means to releasably secure thereto a horizontally disposed wheel rim with a tire mounted thereon, there being additional means provided, to adjust the device towards or away from the clamping member, to raise the mounted wheel and tire under fluid pressure, to pivot the device for forward and down swing, to releasably lock it against swing upon its return to upstanding position and means supplied to permit the device to be swung laterally over and down towards the frame.

References Cited by the Examiner

UNITED STATES PATENTS

| | | | |
|---|---|---|---|
| 1,093,825 | 4/1914 | Bryant | 157—1.26 |
| 1,191,523 | 7/1916 | McPherson | 157—1.26 |
| 1,459,930 | 6/1923 | Riehle | 144—285 |
| 2,213,535 | 9/1940 | Seip | 144—288.1 |
| 2,546,988 | 4/1951 | Eberly | 157—1.24 |
| 2,616,487 | 11/1952 | Parks | 157—1.26 |
| 2,753,924 | 7/1956 | Pearne | 157—1.28 |
| 2,784,777 | 3/1957 | Ammann | 157—1.26 |
| 2,844,194 | 7/1958 | Marshall | 157—1.26 |
| 2,892,491 | 6/1959 | Twiford | 157—1.28 |
| 2,903,049 | 9/1959 | Carlson | 157—1.28 |

FOREIGN PATENTS 161,851    3/1955    Australia.

FRANK E. BAILEY, *Primary Examiner.*

WILLIAM FELDMAN, WALTER A. SCHEEL,
*Examiners.*